Feb. 20, 1968  R. R. WALTON ET AL  3,369,803
FABRIC WORK PIECE FEEDERS

Filed Aug. 11, 1966  6 Sheets-Sheet 1

Inventors
Richard R. Walton
Waldo B. Hanson
By their Attorney

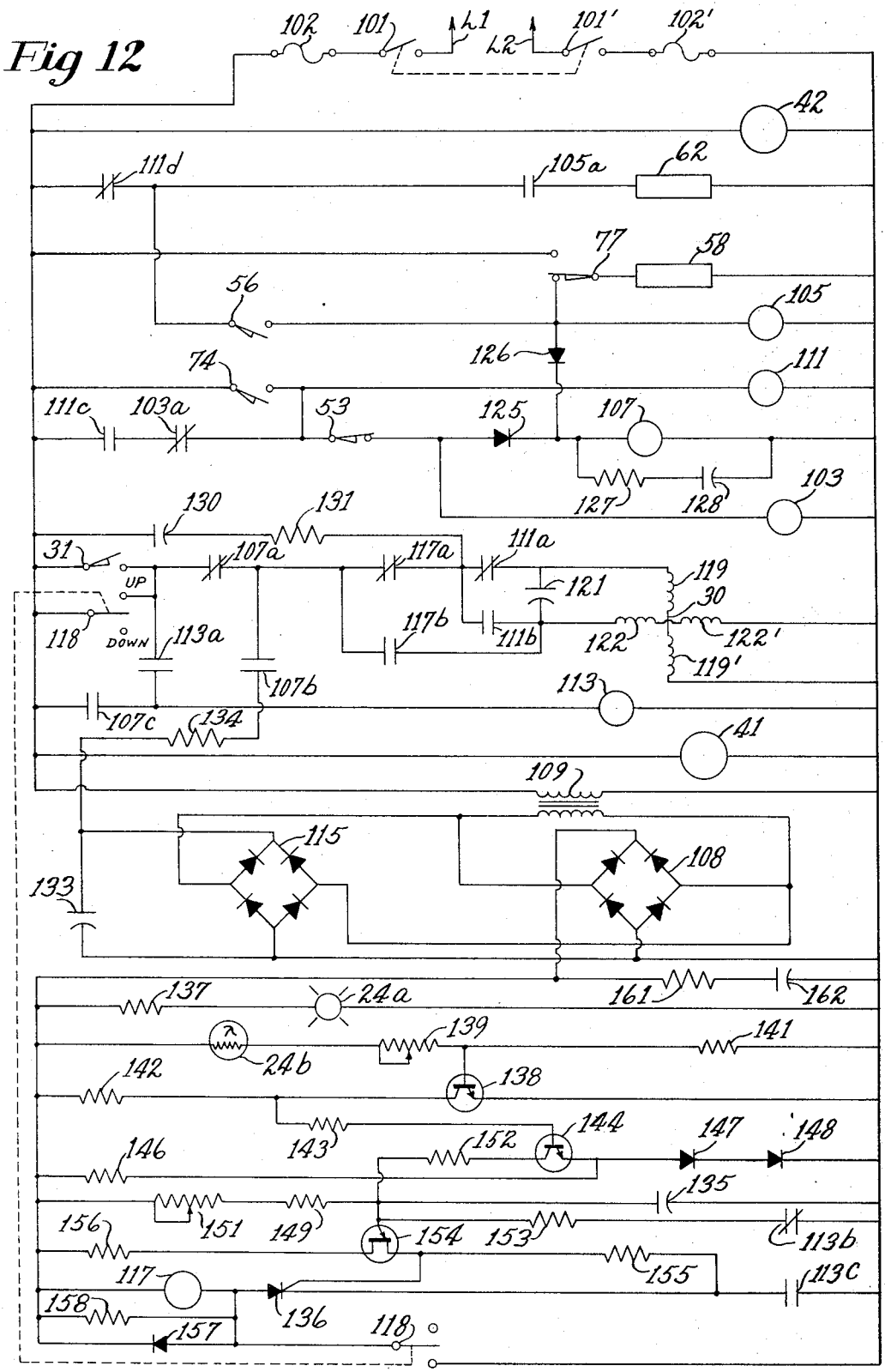

United States Patent Office 3,369,803
Patented Feb. 20, 1968

3,369,803
FABRIC WORK PIECE FEEDERS
Richard R. Walton, Boston, and Waldo B. Hanson, Rowley, Mass., assignors to United Shoe Machinery Corporation, Flemington, N.J., and Boston, Mass., a corporation of New Jersey
Filed Aug. 11, 1966, Ser. No. 571,865
15 Claims. (Cl. 271—10)

This invention relates to means for feeding successive work pieces, especially those of fabric, from the top of a stack. It will be appreciated that, although the invention has particular utility in the handling and processing of folded flexible sheet material, application of the invention is not limited to handling of such material or to the particular construction herein disclosed for purposes of illustration.

United States Letters Patent No. 3,168,307, issued February 2, 1965 to Richard R. Walton and George E. Munchbach, discloses apparatus for consecutively separating the top pieces of fabric from a stack. The problem is one for which solution has long been sought in industry, it being well recognized that fabric limpness, not to mention high drag effect due to friction contact between plies, makes lifting and removal of successive single work pieces slow and tedious. As disclosed in the abovementioned patent a lifting effect is attained by "blower air" on the top piece, the slight air pressure created below the porous top piece being sufficient to prevent raising of the next piece. In a copending application Serial No. 523,301, filed January 27, 1966 in the name of Richard R. Walton, there is disclosed, for optional use in combination with the fabric separator of the cited patent, a novel fabric feeder comprising a multipoint pick-off device. In accordance with the teaching of that application a fabric work piece is engaged and then moved in translation by the closely spaced protrusions of a movable pick-off member which may, for example, comprise card cloth. The foregoing briefly described developments have advantageously reduced the disturbance imposed on a stack of fabric pieces in the course of removing its topmost piece, thus enabling each removed piece to be fed accurately for further processing.

A main object of the present invention is to provide a further improved fabric feeder wherein interfacial interference between a top piece being separated and its underlying next piece to be removed from a stack is considerably reduced if not entirely eliminated.

Another object of this invention is to provide a fabric feeder of the general type indicated wherein, even though the successive pieces to be removed are folded upon themselves and are of irregular contour, operation of the pick-off device, with or without the work "floating" action of the air blower, is enabled to "peel off" topmost fabric pieces from a stack and present them in uniform, predetermined position for further processing.

To these ends, and in accordance with a feature of the invention, there is provided in a machine having a pick-off device movable to feed topmost pieces of fabric from a stack, a movable support for the stack, and means for cyclically moving the support to lower the stack in the course of tangential and upward movement of the device therefrom to separate the top piece with minimal drag thereon and with no appreciable disturbance of the stack. If the top piece be pre-folded the relative heightwise separation of the stack support and pick-off device permits progressive "peeling off" of a top ply with respect to an underlying one and very little or no distortion is imparted to the latter.

A further feature of the invention resides in the provision in a fabric work piece feeder having means for successively separating and feeding topmost fabric pieces from a stack, each piece having at least one marginal portion extending in advance of its main body, of means yieldingly engageable with the advance marginal portion to insure that it is progressively removed.

In a method aspect, the invention comprises moving successive top fabric pieces from a stack by supporting the stack in spaced relation with a pick-off device, facially engaging each top piece with the pick-off device to tension the fabric in translation, and simultaneously lowering the fabric supporting means to provide a "peeling off" of a top ply with respect to an underlying ply with little or no distortion being imparted to the underlying ply.

The foregoing and other features of the invention, together with various novel details and combinations of the parts, will now be more particularly described in connection with illustrative embodiments and with reference to the drawings and pointed out in the claims.

In the drawings:

FIG. 12 is a schematic electrical diagram showing the circuitry employed in the fabric feeding apparatus of FIGS. 1–11.

Figure 1:
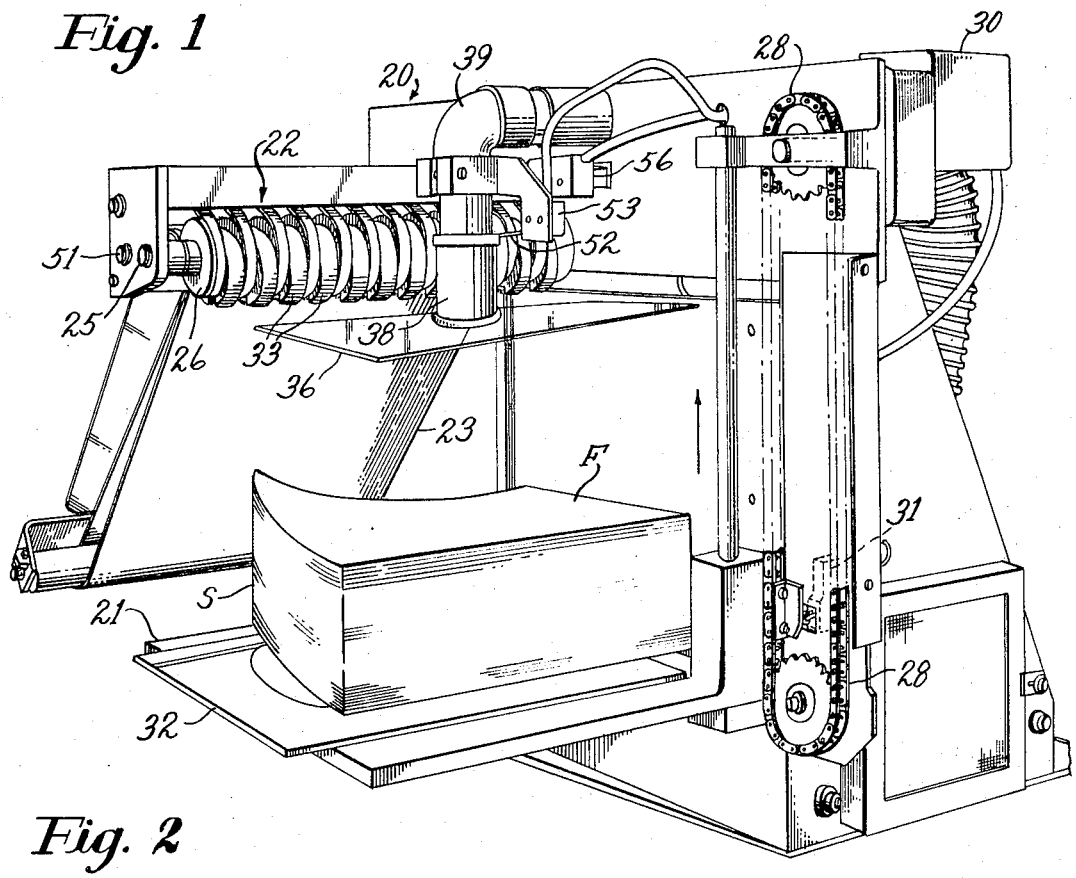
FIG. 1 is a front perspective view showing fabric feeding apparatus construction in accordance with teachings of the present invention.
Figure 2:
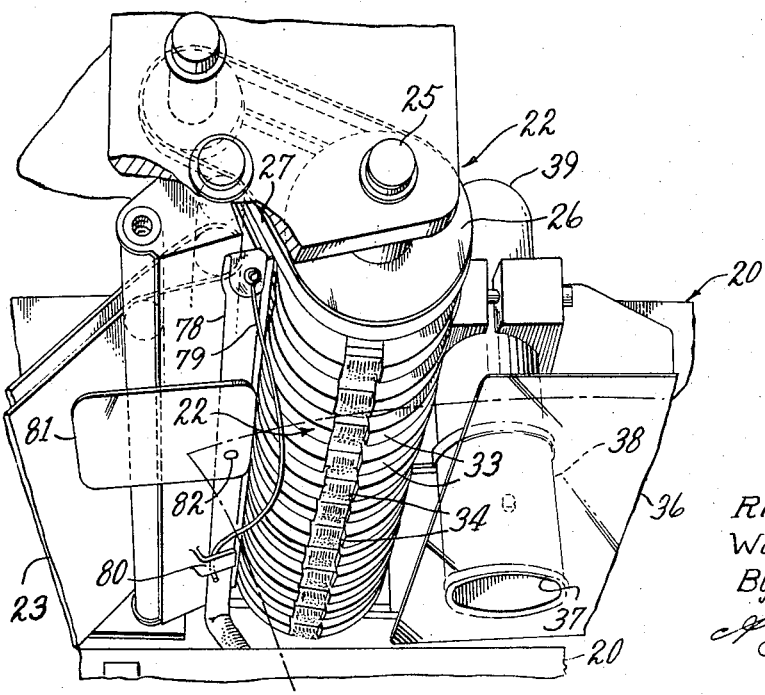
FIG. 2 is a fragmentary perspective view showing details of the apparatus of FIG. 1 taken on an enlarged scale for clarity.
Figure 3:
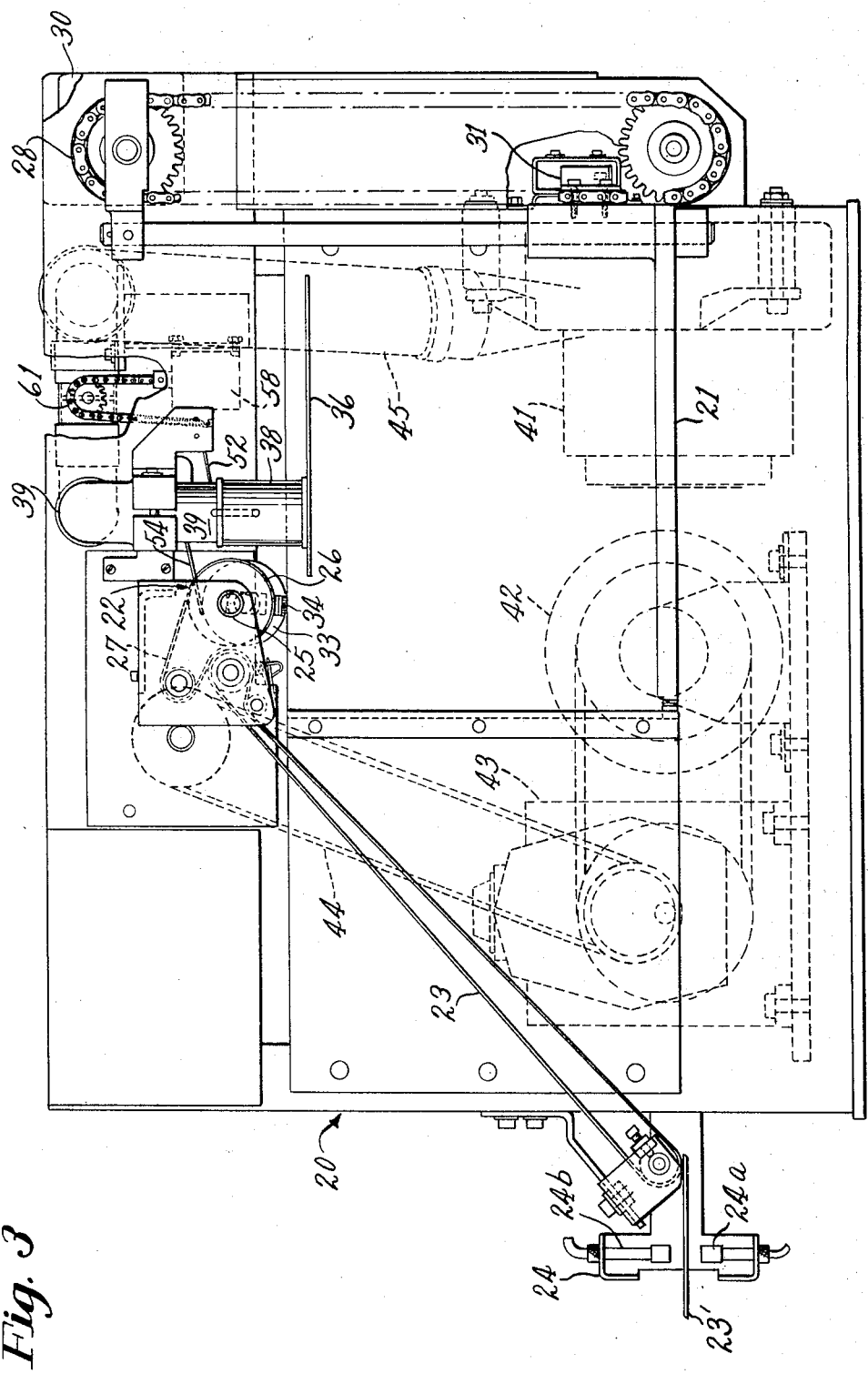
FIG. 3 is a front elevational view showing the apparatus of FIG. 1, with portions of the apparatus removed to show additional details of the structure.

Referring now to FIGS. 1–3 of the drawings, the fabric feeding apparatus comprises a frame 20 comprising members on which there is mounted a vertical work supporting means in the form of an elevator 21, a gravitational type pick-off means generally designated 22, and an endless conveyor 23 which serves as a transfer means for the fabric pieces removed from the elevator by the pick-off means.

As shown in FIG. 3, the conveyor 23 may, in turn, pass adjacent another transfer means in the form of a belt conveyor 23' which serves to carry the fabric pieces to another work station. A sensing device 24 is provided in the form of a light source 24a and a photoelectric cell 24b disposed on opposite sides of an opening between the belts of the conveyor 23'. The sensing device 24 is connected into the electric circuit of the apparatus, which together comprise a sensing means effective to shut down the operation of the apparatus should a jam-up of the fabric pieces occur, or whether a fabric stack S on the elevator 21 is depleted.

The elevator 21 is movable in the vertical direction, as indicated by the arrow in FIG. 1 by being driven through a chain and sprocket assembly 28 operated by an elevator motor 30. As further shown in FIGS. 1 and 3, a normally closed electric switch 31 is positioned on the frame 20 such that its contacts are open when the elevator is in the lowermost position, see also FIG. 12. The function of the switch 31 will be explained in detail as the description proceeds. While the stack of work pieces may be placed directly on the upper surface of the elevator 21, the stack is herein shown as carried by a pallet 32 which is in turn placed on the elevator. It is generally desirable to align the stack S relative to the fabric pick-off means 22 to insure proper contact of the pick-off means with the fabric pieces, and to this end, the pallet 32 provides a simple means of moving the stack S over the surface of the elevator 21. The pallet 32 is also provided with a friction surface on which the stack S is supported to prevent sliding of the lower fabric pieces when the stack is near depletion.

A plurality of coacting pick-off means 22 are shown in detail in FIG. 2. The pick-off means 22 comprises a plurality of picker discs 33 each having a card cloth backing 34 mounted in the disc carrying projecting, angularly biased wire, the clustered work engaging ends of which form an operating face lying substantially in a common plane. The pick-off means 22, as shown, is fully described and disclosed in the copending application Serial No. 523,301—Walton, as referred to above.

The pick-off means 22, as shown, are mounted on a common shaft 25 with a plurality of free running pulleys 26 which are each rotated by a belt 27 passing adjacent the conveyor 23.

Figure 11:
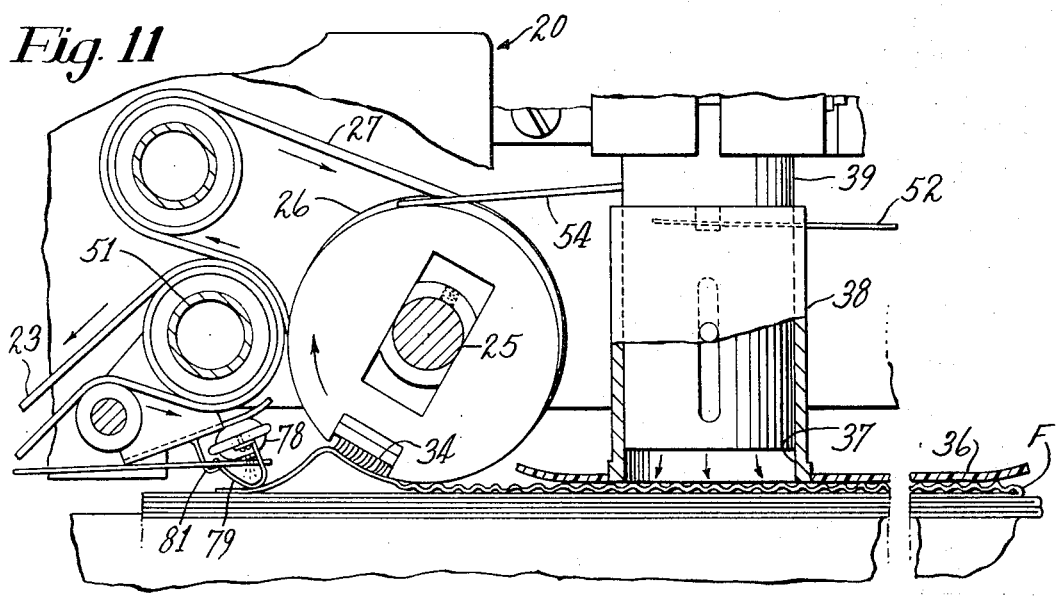

Directly above the stack S of work pieces there is located a relatively thin resilient plate 36 which may be fabricated from a flexible plastic or other material. This plate is supported adjacent the outlet opening 37 of a hollow sleeve 38 which is slidable vertically on the lower end of an air conduit 39 (FIG. 11). The function of the flexible plate 36 and its cooperation with the outlet opening 37 are shown and described in detail in U.S. Patent No. 3,168,307 to R. R. Walton et al., referred to hereinbefore.

Referring particularly to FIG. 3, it will be noted that in addition to the elevator motor 30, the apparatus is further provided with a blower motor 41, and a main drive motor 42. The main drive motor 42 operates through a variable speed drive 43 to provide power for operation of the conveyor 23, and the picker discs 33, through mechanism including a chain and sprocket assembly designated as 44. The blower operated by the motor 41 is connected by a conduit 45, through which a continuous flow of air is channeled, to the conduit 39 and to other portions of the apparatus where high pressure air is used.

Figure 4:
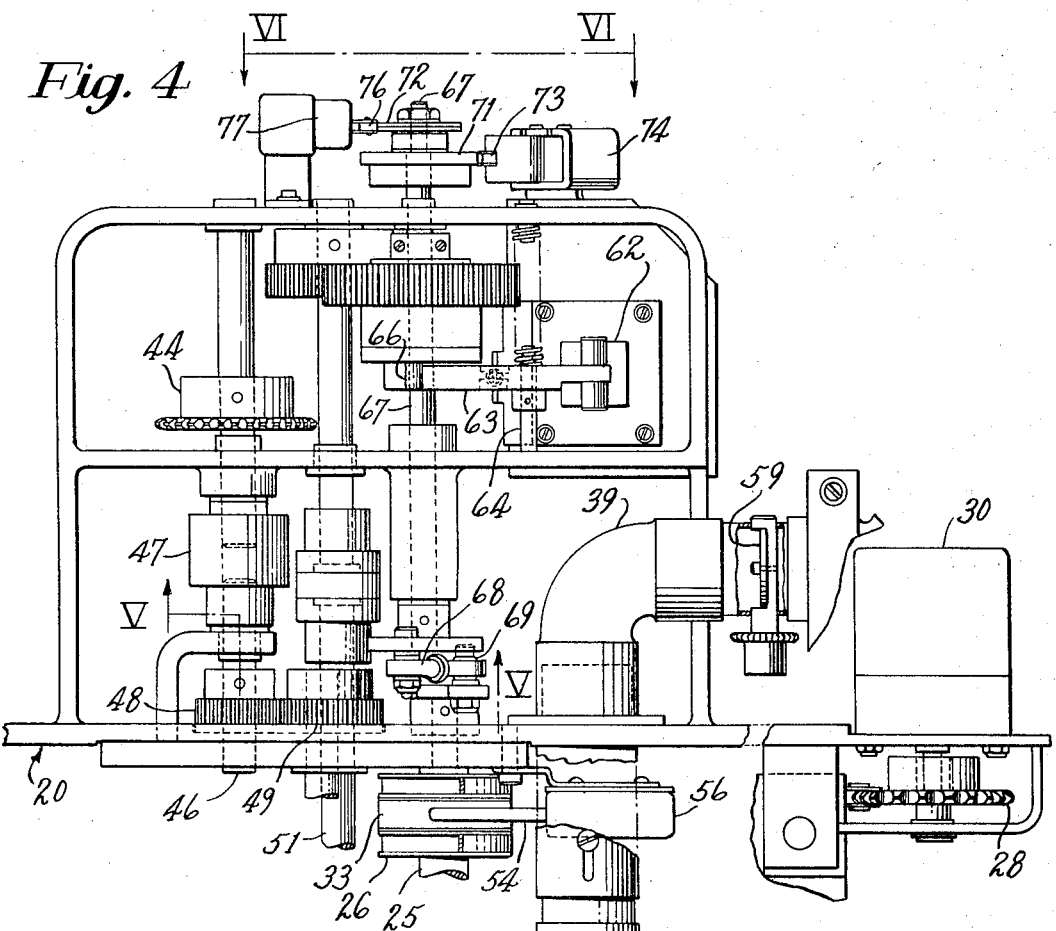
FIG. 4 is a fragmentary top plan view, partially in section, showing a portion of the drive mechanism of the apparatus of FIG. 1 on a greatly enlarged scale.
Figure 5:
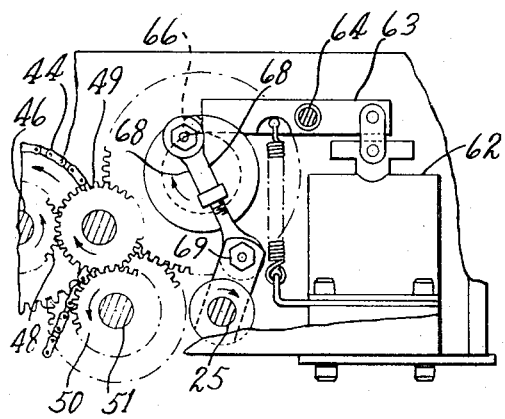
FIG. 5 is a sectional elevational view taken along line V—V of FIG. 4 and looking in the direction of the arrows showing details of the pick-off means actuating mechanism.
Figure 6:
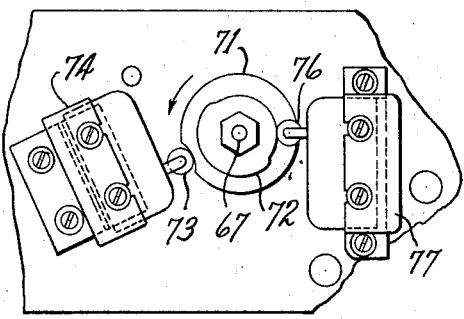
FIG. 6 is an elevational view taken along line VI—VI of FIG. 4 and looking in the direction of the arrows showing cooperating elements for providing a tie-in between the mechanical structure and the electrical circuit of the apparatus.

Reference should now be made to FIGS. 4–6 taken in connection with the previously described FIGS. 1–3 for a description of a single cycle of the feeder apparatus as set forth in the following paragraphs.

To initiate operation of the pick-off and feeder apparatus, both the main drive motor 42 and the blower motor 41 are energized. Operation of the motor 42 causes the chain and sprocket assembly 44 to rotate and turn a shaft 46 through a torque limiting device 47. The shaft 46 operates through a gear train 48, 49 and 50 (best shown in FIGS. 4 and 5) to cause continuous rotation of a shaft 51, journaled on the frame 20. This shaft, as shown, is operatively connected to the aforementioned belts 27 by frictional engagement with the conveyor 23, which in turn serve to rotate the pulleys 26 on the shaft 25. The pulleys 26 are free running on the shaft 25 while the picker discs 33 are keyed to the shaft by virtue of their slotted axes and therefore remain stationary, rotating only with rotation of the shaft.

With the various elements of the apparatus disposed as shown in FIG. 1, and the motors 41 and 42 operating as described above, the elevator 21 is raised by energizing the elevator motor 30 in a manner which will be hereinafter described. The elevator 21 is raised to a point at which the top sheet F of the stack S contacts the flexible plate 36 causing the sleeve 38 to move upwardly on the conduit 39 and to contact a switch arm 52. As best shown in FIG. 4, the switch arm 52 is operatively connected to a microswitch 53 which is part of an electrical circuit which is to be described in greater detail.

As a further consequence of upward movement of the stack S contact is made between the top fabric piece F and the picker discs 33 which move upwardly, one of which contacts a switch arm 54 to operate the microswitch 56. The microswitch 56 is so located in the electrical circuit as to cause the elevator motor 30 to be braked in the up position of the elevator 21 and simultaneously to initiate operation of a time delay means in the circuit when energized. In addition, energization of the microswitch 56 operates an air conditioning solenoid 58 (shown in FIG. 3) which is effective to rotate a butterfly valve 59 (FIG. 4) to the open position through a chain and sprocket assembly 61, FIG. 3. Opening of the butterfly valve permits a flow of air through the conduit 45 and the conduit 39 terminating in a blast downwardly directed toward the fabric stack S, through the opening 37 (FIG. 11).

When a time delay means initiated by microswitch 56 has run out, the electrical circuitry is energized to operate a solenoid 62 which is best shown in FIGS. 4 and 5. The solenoid 62, when energized, turns a link 63 in a downward direction about a pivot rod 64 to release a stop pin 66. Release of the stop pin permits a single revolution clutch to operate and turn a shaft 67 through 360°. As is evident from FIG. 5, 360° rotation of the shaft 67 further acts on a link 68 to produce a substantially downward and then upward movement of a pivot pin 69. Movement of the pivot pin 69 in the downward direction is effective to rotate the shaft 25 and the picker discs 33 in the clockwise direction as shown in FIG. 5, while upward movement of the pin 69 causes counterclockwise movement of the shaft and picker discs. The shaft 25 is thus caused to rotate clockwise and return counterclockwise through an arc of about 90°. However, the degree of rotation may be changed by varying the length of the linkage members should a greater or lesser degree of rotation of the shaft 25, and the picker discs 33 be desired. During operation of the single revolution clutch mechanism as described above air continues to flow through the conduit 39 and downwardly from the opening 37 to the stack S causing fluttering of the topmost ply (see FIG. 11).

Referring now to FIG. 6, it will be noted that the shaft 67 has a pair of cam discs 71 and 72 mounted at the rear portion thereof, the disc 72 being adjustable relative to disc 71 by rotating it to a different position on the shaft. The cam disc 71 serves to operate a switch arm 73 of a microswitch 74, and the cam disc 72 serves to operate a switch arm 76 of a microswitch 77.

The initial rotation of the shaft 67 to turn the picker discs 33, rotates the cam 71 to almost simultaneously operate the microswitch 74 which is effective in the electrical circuit to release the braking means and reverse the elevator motor 30 for downward movement of the elevator 21. After a small time lapse, as is evident from the shape of the cam disc 72 (FIG. 6), the microswitch 77 is closed and becomes the controlling element for the air flow. At a later point in time, when the microswitch 77 is reclosed by the cam disc 72, the microswitch 77 is effective to close the butterfly valve 59 shutting off the air to the conduit 39. The operation of the microswitch 74 and the microswitch 77 will be explained in greater detail in the description of the electric circuit shown in FIG. 12.

The elevator 21 moves downwardly through a distance of approximately ⅞" in the device shown, during which travel the switch arm 52 is caused to move downwardly by the resultant downward movement of the sleeve 38. Movement of the switch arm 52 closes the microswitch 53 which is effective in the electrical circuit to brake the elevator 21 and initiate a second time delay in the electrical circuit. When this time delay has elapsed, the elevator motor 30 is caused to reverse its direction, the elevator 21 is driven upwardly, and the operating cycle is repeated.

Referring back to FIG. 2, it will be observed that at a position slightly forward of the picker discs 33 a tubular member 78 is mounted on the frame 20 which has a resilient spring member 79 fixed adjacent one end thereof and slidably disposed adjacent the other end in an angle bracket 80. The tubular member 78 has a flexible plate 81 extending laterally therefrom, and an opening 82 provided therein directly above the lowermost extension of the resilient spring member 79, through which air continuously flows during operation of the feeder apparatus. The effect of the resilient spring member 79 and the continuous air flow on the operation of the feeder apparatus will be explained in greater detail and will become evident during the description of FIGS. 7–11.

For better understanding of the operation of the feeder apparatus described in the preceding paragraphs, reference should now be had to FIGS. 7–11 where there is shown a stack S of fabric pieces, each piece F having a single fold causing the piece F to be stacked in double ply. While the description of the feeder apparatus is shown in its operation on a stack of such double ply sheets of irregular shape, see FIG. 1, it should be here brought out that the apparatus may be employed in like manner where the stack S contains single ply sheets or sheets of uniform shape. However, its operation has proved to be especially effective where the sheets are of double ply, having a marginal portion extending therefrom as shown, and where other such devices fail to feed such double ply pieces in an acceptable manner. It will further be noted that although the sheets F are folded, the feeder presents each sheet F in its single ply form on the conveyor 23 from which it may be further operated on without additional handling.

Figure 7:
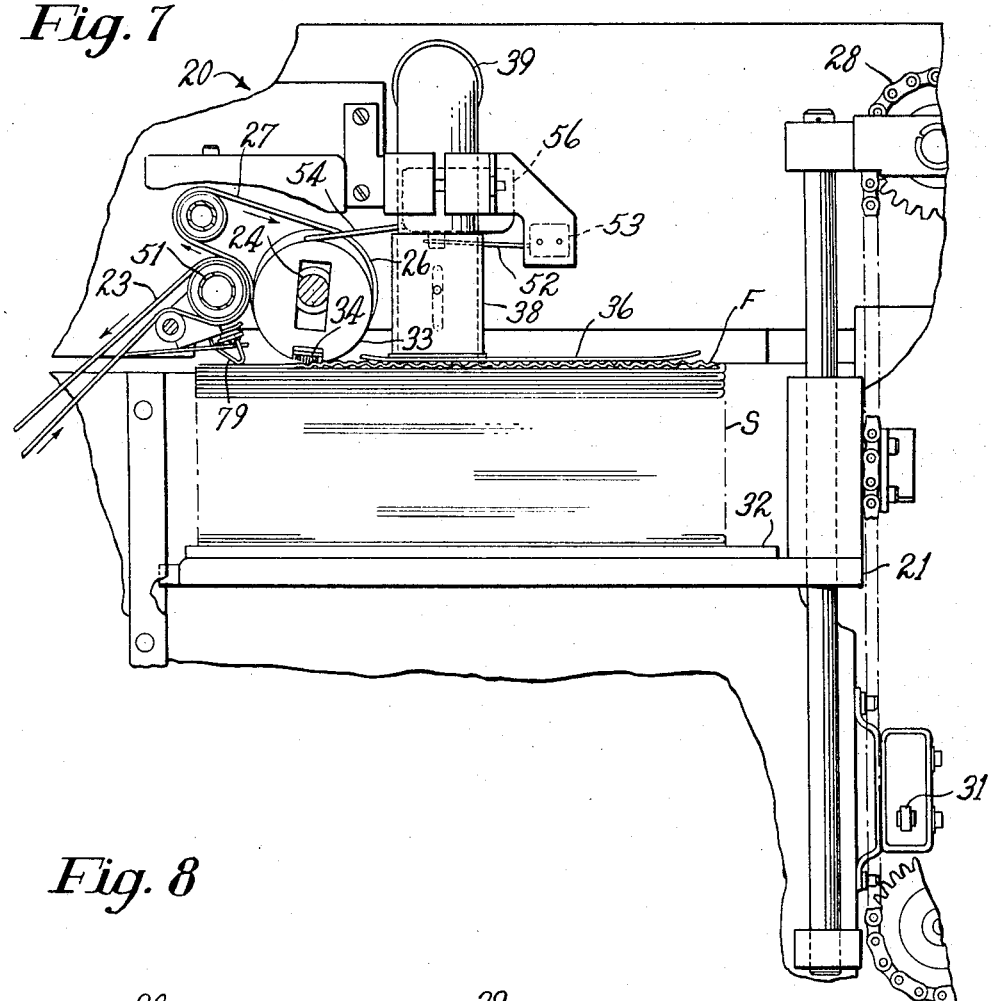
FIGS. 7–11 are fragmentary front elevational views showing the apparatus of FIGS. 1 and 3 taken at various times during the sequence of operation.

In FIG. 7 the elevator 21 is shown having reached its uppermost position and it will be observed that the air flowing from the conduit 39 is effective to produce a fluttering of the top ply of the top piece F. The top ply is loosened by the air stream passing over the upper surface of the piece F, which air stream has high speed portions to produce both lift and flutter. This action is explained in detail in the prior cited U.S. Patent No. 3,168,307 to R. R. Walton et al.

Simultaneously, the picker discs 33 are in contact with the upper ply of the piece F and have started the cycle of clockwise rotation as shown in FIG. 7. At this point in the operation, the resilient spring member 79 is in contact with the extending marginal portion of the piece F and the air is flowing from the opening 82 in the tubular member 78 to produce lift at the edges of the marginal portion of the top ply.

The action of the picker discs 33 is shown in greater detail in FIG. 11 which depicts the cycle of operation at a short time lapse after that depicted in FIG. 7. The picker discs 33 have moved through a small arc and the top ply of the piece F is being moved upwardly toward the conveyor 23 while still having its forward edge held by, but being moved under, the resilient spring member 79. It will also be noted from FIG. 11 that the sleeve 38 is slidably retained on the conduit 39 adjacent the uppermost ply of the stack S, the sleeve being substantially supported above the stack by virtue of air flowing therethrough. The flexible plate 36 has a resiliency permitting its outer portions to rise above the piece F of the stack S and thereby permit the flutter and lift of the top ply as above noted.

Figure 8:
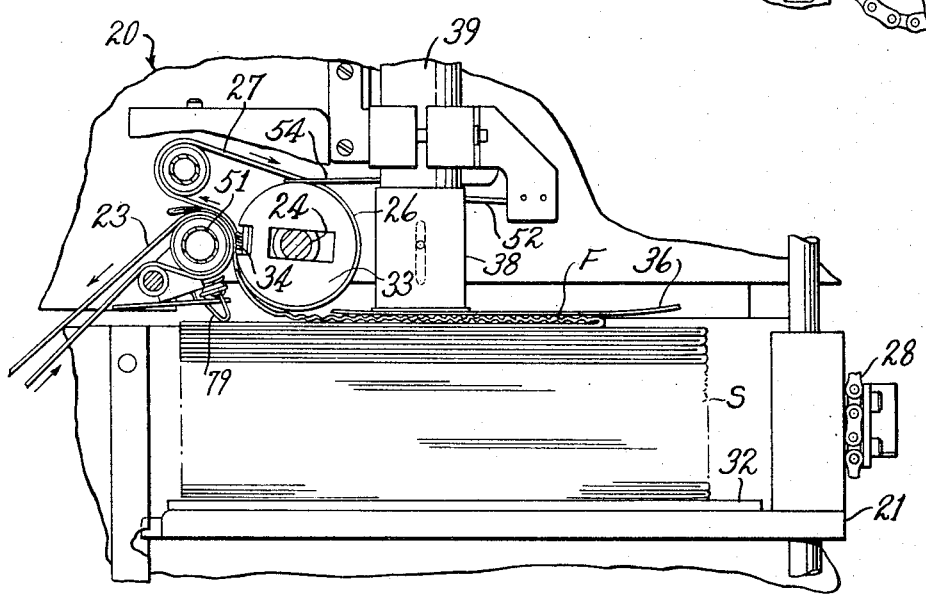

Reference should now be had to FIG. 8 wherein the elevator 21 is moving downwardly and the picker discs 33 have gone through a rotation of approximately 90°. The top ply of piece F is now deposited on the conveyor 23 and the resilient member 79 is pressing against the bottom ply of the piece F. As is indicated from the fluttering of the top ply, the air remains on during the initial downward movement of the elevator 21, which is caused by the adjustable setting of the cam disc 72.

Figure 9:
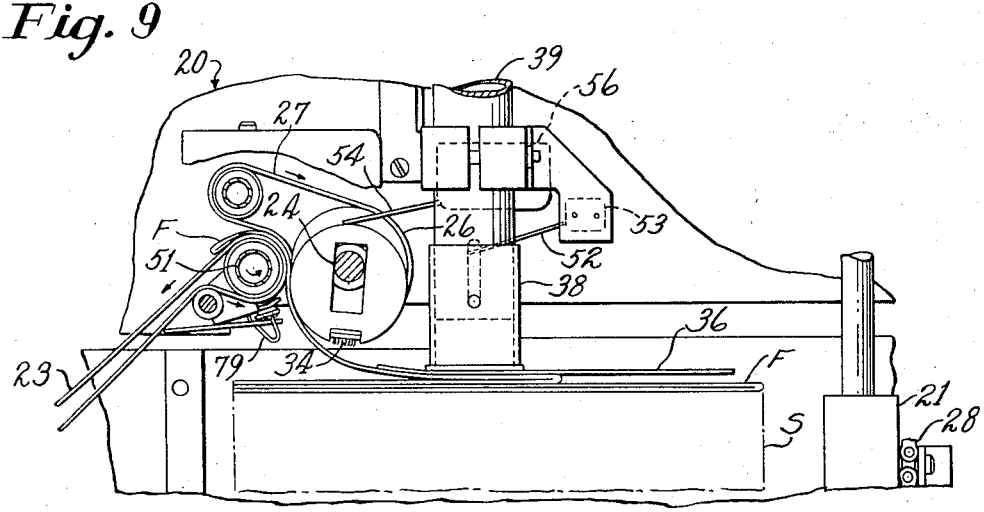

Referring now to FIG. 9, the picker discs 33 have returned to their initial position and the elevator 21 has reached its lower position in the cycle of operation. As may be observed, at this point the air is not flowing through the conduit 39 and the resilient spring member 79 is no longer in contact with the bottom ply of the piece F. The piece F at this point in time is being fed by the conveyor 23 and the belts 27.

Figure 10:
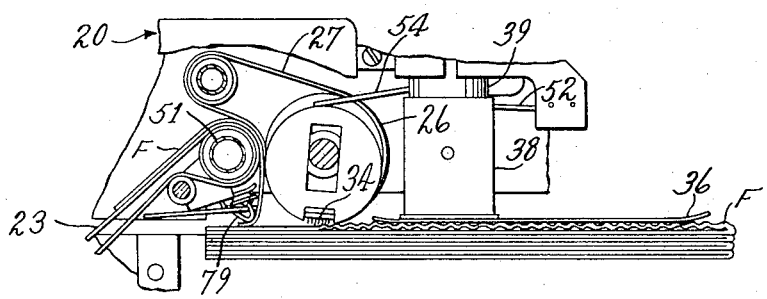

Reference will now be had to FIG. 10 wherein the elevator 21 is substantially in the same position as that shown in FIG. 7, and a new cycle of operation is about to begin. As shown in FIG. 10, the end portion of the bottom ply of piece F has not left the stack S and is again contacted by the resilient member 79. The member 79 thereby aids in retaining the bottom ply of piece F at a position forward of the picker discs 33 until it is fed onto the conveyor 23.

As previously eluded to, the feeder device is herein shown and described as operating on a stack S wherein the sheets are folded, and of irregular shape. Referring back to FIG. 9, the reader will observe that, with fabric pieces having a forward marginal portion relatively long in comparison with the main body of the stack, a small fold will occur at the forward extremity of the sheet F. This small fold, if it should occur, may be removed by pneumatic means in the form of a blast of air directed from below the conveyor 23', or by mechanical means.

Reference should now be had to FIG. 12 wherein there is depicted schematically an electric circuit having power supplied from an ordinary 115 volt source through lines L1–L2. A double throw switch 101–101' is provided for deactivating the powered circuit, and fuses 102–102' are disposed in the lines, as is customary for protection of the apparatus.

Referring particularly to the upper portion of the diagram depicted in FIG. 12, in addition to those elements which have been previously described and which have been given like reference numerals for clarity, the circuit contains a time delay relay 103 having contacts 103a, and a second time delay relay 105 having contacts 105a. Additionally, the circuit includes a brake relay 107 having contacts 107a, 107b and 107c suitably disposed in the circuitry. The remaining basic elements in the circuit to be described include a bridge rectifier designated by the numeral 108, a transformer 109 and an additional pair of relays 111 and 113 which are connected into the circuit through contacts 111a, 111b, 111c, 111d and 113a, 113b, 113c respectively.

The portion of the circuit referred to above is generally effective as a means to automatically control the operation of the various components of the feeder apparatus, and as such, could be utilized without those elements shown in the lower portion of FIG. 12 which comprise the sensing portion of the circuit.

Referring to the lower portion of FIG. 12, there is shown those electrical components which have been included in the present apparatus to provide means for sensing a jam-up in the apparatus or when the stack of fabric sheets is depleted, and means for subsequently shutting down the feeder apparatus. Included in these electrical components, in addition to the light source 24a and photoelectric cell 24b, previously mentioned, is a bridge rectifier 115 and a relay 117 having contacts 117a and 117b which are connected to the power supply lines leading to the elevator motor 30.

In practice, the feeder apparatus is put into use by closing the switches 101–101' to provide power to the circuit, which immediately starts operation of both the main drive motor 42 and the air supply motor 41. As previously described, both the main drive motor 42 and the blower motor 41 are in continuous operation during use of the feeder mechanism, the motor 42 serving to rotate the pulleys 26 and the conveyor 23, and the air supply from the blower motor 41 being regulated by movement of the butterfly valve 59 to provide a blower means.

To initiate operation of the feeder apparatus, a spring-loaded up-down toggle switch 118 is held in the up position momentarily. This supplies voltage directly through the contacts 107a, 117a and 111a to the winding 119–119' of one phase of the elevator motor 30, and through a capacitor 121 to the windings 122–122' of the other phase of the motor. This application of voltage to the motor 30 causes the motor to turn in a direction to raise the elevator 21 upwardly. When the elevator 21 leaves its lowermost position, microswitch 31 closes, and at this point the switch 118, which is spring-loaded, may be released to return to its neutral position.

The elevator 21 travels upwardly and at its uppermost position microswitch 56 is closed which in turn energizes the coil of the time delay relay 105 and the coil of the brake relay 107. Energizing the relay 107 is effective to open contact 107a and to close contact 107b applying a DC voltage from the loop containing the bridge rectifier 115. The DC voltage is applied across the winding 119–119' of the motor 30 and serves to stop the motor and consequently to hold the elevator 21 in its uppermost position. Simultaneously, closing of the microswitch 56 causes energization of the air controlling solenoid 58 through the switch 77 which is in the closed position. As previously described, the air controlling solenoid, when energized, is effective to cause air to be blown down at the top of the stack S by opening of the butterfly valve 59.

After a preset period of time, the time delay relay 105 times out and closes the contact 105a which in turn energizes the one revolution clutch solenoid 62. The microswitches 74 and 77, it should be recalled, are now operated by rotation of the cam discs 71 and 72 as the shaft 67 is rotated. With the arrangement shown, the switch 77 operates early in the cycle and the duration of closure may be adjusted by split cam 72 to permit a variation in the time that the air is blown to the top of the stack S. It should here be noted that operation of the switch 77 from the closed position to the open position actually interrupts power to the solenoid 58. However, the time duration is very short and therefore does not allow the solenoid to drop out. At the end of the cycle, when the switch 77 returns to the normally closed position, there is no voltage present in the line and, at that time, the solenoid 58 drops out.

The switch 74 also closes early in the cycle and energizes the relay 111. The relay 111 latches itself up through the contact 111c and contact 103a. At this point the contact 111d opens and removes power from the solenoid 62, relay 107, and the normally closed contact switch 77. Removal of power from the clutch solenoid 62 serves to insure that the apparatus does not go through two cycles, while removal of power from the brake relay 107 removes the DC braking voltage from the elevator motor 30.

A pair of diodes 125 and 126 are placed in the lines leading to the relay 107 and are effective to eliminate back circuits. Since the diodes 125 and 126 act as halfway rectifiers, a resistor 127 and capacitor 128 are placed in parallel with the relay 107 to prevent relay chattering.

When the relay 111 is energized, it serves to open contacts 111a and to close contact 111b. The contact 107a closes at the same time voltage is directly applied to the windings 122–122' of the motor 30 through contacts 117a and 111b. As a result of current flow through the second phase of the motor 30, the motor is reversed and the elevator 21 is driven downwardly.

It should here be recalled that the switch 53 is positioned such that upward movement of the elevator 21 causes the sleeve 38 to move the switch arm 52 upward to open the switch 53. At the present time in the description of operation, the switch 53 now closes to indicate that the elevator 21 has reached its low operating position. Voltage is now applied to the brake relay 107 and to the time delay relay 103, through contacts 111c and 103a. The elevator 21 is braked by the DC voltage passing through the motor 30, as previously described, and the elevator 21 remains in the lowermost position until the relay 103 times out and operates to open the contact 103a. Opening of the contact 103a brakes the latch on relay 111 and restores the circuit to its initial condition. The circuit also is provided with a capacitor 130 and resistor 131 which constitute an arc suppressor network as well as a filter capacitor 133 and a current limiting resistor 134.

The lower half of FIG. 12 consists of a photoelectric circuit which serves to detect when there is a jam-up in the feeder apparatus, or when the entire stack S is depleted. The circuit is so adjusted that a pre-set frequency of interruption must occur due to fabric pieces passing between the light source 24a and the photoelectric cell 24b, or in the absence thereof, the relay 117 is energized. When the relay 117 is energized, contact 117a opens and contact 117b closes, thereby applying power to the elevator motor 30 in such a manner so as to drive the elevator downwardly to its lowermost position which opens the switch 31.

In the present device, the time required to initially raise the elevator 21 to its operating position is longer than the period of time between successive fabric sheets and the detection circuit must therefore be inhibited during initial raising of the elevator. The contacts of a relay 113a and 107c are effective to prevent this function.

During operation of the device, the first time the brake relay 107 is energized, the contact 107c closes and energizes the relay 113 which latches in through the contacts 113a and microswitch 31. The contact 113b in the photoelectric circuit opens and removes the short circuit from a timing capacitor 135. The contact 113c closes and establishes a circuit in the cathode of a controllable rectifier 136. This sequence conditions the circuit so that at this time in operation of the apparatus, the detection circuit is activated.

The light source 24a is placed in series with a current limiting resistor 137 and produces short impinges on the photocell 24b. When light is allowed to fall on the photocell 24b its resistance decreases allowing more base current to flow into a transistor 138. A variable resistor 139 is placed in the circuit to adjust the sensitivity of the circuit by shifting the point at which the transistor 138 turns on, and a resistor 141 is provided in the line to serve as a stabilizing element.

When the transistor 138 is turned on it decreases the voltage at the junction of a resistor 142 and a resistor 143, thereby cutting off the base current into, and subsequently turning off the transistor 144. A resistor 146, and diodes 147 and 148 serve as biasing elements in the circuit for the transistor 144. When the transistor 144 is cut off, current is allowed to charge the capacitor 135 through a resistor 149 and a variable resistor 151. Both the contact 113b and the transistor 144 act to short circuit the capacitor 135 with resistors 152 and 153 serving to limit current flow in the line. The setting of the variable resistor 151 determines the length of time necessary to charge the capacitor 135 when the contact 113b is open and the transistor 144 is turned off.

When the voltage across the capacitor 135 reaches approximately 60% of the voltage across a transistor 154, the capacitor 135 discharges into the emitter circuit. The current flowing into the transistor 154 has two paths, one through a resistor 155 and contact 113c, and the other into the gate circuit of the controllable rectifier 136. Resistor 156 sets up the bias of the transistor 154. The gate current is of sufficient magnitude as to turn on the controllable rectifier 136 which in turn energizes the relay 117. The controllable rectifier 136 will stay on as long as current is flowing through the anode-cathode circuit, and the relay 117 operates to open contact 117a and close contact 117b to apply power to the elevator motor 30 and drive the elevator 21 to its lowermost position.

A diode 157 is placed in the circuit to reduce the voltage spike across the controlled rectifier 136 which is generated when the relay 117 is turned off. A resistor 158 is provided in parallel with the coil of the relay 117 to cause sufficient current to flow through the controlled rectifier 136 and keep it conducting.

Additionally, the sensing circuit has provided therein a current limiting resistor 161 and a filter capacitor 162 placed in the line leading from the bridge rectifier 108, which provides power to the circuit.

From the foregoing, it should be evident that the present invention achieves the various objects set forth by providing an improved fabric feeder having means for greatly reducing interfacial interference between a fabric piece being separated and its underlying next piece. In the device described, cyclical lowering of the fabric support during tangential and upward movement of a fabric piece is highly effective to create a "peeling off" of the piece from an underlying ply.

Having thus described our invention, what we claim as new and desire to secure by Letters Patent of the United States is:

1. Apparatus for feeding fabric sheets singly from a stack, comprising means for supporting a stack of fabric sheets, pick-off means disposed in spaced relation with said support means for cyclically engaging and moving a portion of each successive upper sheet of the stack with a component initially parallel to and then away from the top of the stack, then releasing the sheet and finally returning to its starting position, drive means operatively connected with said support means for movement of said support means from a first position wherein the upper sheet of the stack is in engagement with said pick-off means to a second position wherein the stack is disposed below its first position; and automatic control means connected to said drive means to cause said drive means to move said support means from said first position to said second position and back to said first position during one cycle of said pick-off means.

2. The apparatus of claim 1 which further includes conveyor means located adjacent the operative path of said pick-off means for transfer of the upper sheet from the control of said pick-off means.

3. The apparatus of claim 1 which further includes air blower means disposed adjacent the upper sheet of the stack for directing air against the sheet to be removed by said pick-off means, in an area rearward of said pick-off means for facilitating separation of that portion of the upper sheet contacted by said pick-off means from an underlying fabric ply.

4. The apparatus of claim 1 wherein said means for automatically controlling said drive means is connected with said pick-off means and is effective to initiate operation of said drive means to move said support means from said first position to said second position in response to movement of said pick-off means.

5. The apparatus of claim 3 wherein said blower means and said pick-off means are connected to said automatic control means, said control means being further effective to initiate operation of said drive means to move said support means from said first position toward second position, and thereafter shut down operation of said blower means in response to said pick-off means movement of the upper sheet of the stack.

6. The apparatus of claim 5 which further includes conveyor means located adjacent the operative path of said pick-off means for transfer of the upper sheet from the control of said pick-off means and means connected with said control means for sensing a substantially uniform flow of fabric sheets along said conveyor means, said control means being further effective to shut down operation of said drive means in response to said sensing means having indicated a break in substantially uniform flow of fabric sheets along said conveyor means.

7. A fabric feeding device comprising: an elevator for supporting a stack of fabric sheets, a plurality of rotatable picker discs cyclically operable for engaging a topmost sheet of the stack and moving a portion of the sheet tangentially of the stack and then heightwise of the stack by rotation thereof in one direction, and releasing the sheet on rotation thereof in the opposite direction, a drive motor operatively connected with said elevator to move said elevator from a first position wherein the topmost sheet of the stack is in engagement with said picker discs, to a second position wherein the stack is disposed below its first position, and an electrical control circuit connected with said drive motor to cause said drive motor to move said elevator from said first position to said second position and back to said first position during one cycle of said picker discs.

8. The device of claim 7 wherein said control circuit is connected with said picker discs such that rotation of said discs in said one direction is effective to cause said drive motor to move said elevator from said first position toward said second position in response to said rotation.

9. The device of claim 8 which further includes blower means for directing air to the topmost fabric piece to provide a floating of the piece and facilitate removal of the topmost ply from an underlying ply, said control circuit being connected with said blower means to shut down operation of said blower means in response to rotation of said picker discs and during movement of said elevator from said first position to said second position.

10. Apparatus for feeding topmost fabric sheets from a stack wherein each piece has a marginal portion extending from its main body comprising means for supporting the stack of fabric sheets, pick-off means disposed in spaced relation with said support means for cyclically engaging and moving a portion of the main body of each successive upper sheet of the stack with a component initially parallel to, and then away from, the stack and releasing the sheet, drive means operatively connected with said support means for movement of said support means from a first position wherein the upper sheet of the stack is in engagement with said pick-off means to a second position wherein the stack is disposed below its first position; automatic control means connected to said drive means to cause said drive means to move said support means from said first position to said second position and back to said first position during each successive cycle of said pick-off means, and means yieldingly engaging the marginal portion of the upper ply when said support means is in said first position and during a portion of said support means movement to said second position, and engaging the underlying ply during movement of said support means from said second position to said first position.

11. The apparatus of claim 10 which further includes air blower means disposed adjacent the upper ply of the stack for directing air against the main body of the upper ply to be removed by said pick-off means in an area rearward of said pick-off means, and wherein said means yieldingly engaging the upper ply is disposed forwardly of said pick-off means.

12. The apparatus of claim 11 wherein said yieldingly engaging means is in the form of an arcuate wire member supported above the marginal portions of the fabric sheets and further comprising other blower means for directing air against the marginal portion of the upper ply to facilitate disengagement of the upper ply from an underlying ply.

13. The method of removing successive top fabric sheets from a stack which comprises the steps of, providing a fabric pick-off means; supporting the stack of fabric sheets in spaced relation with said fabric pick-off means, positioning the stack of fabric sheets such that a portion of the upper sheet of the stack is in engagement with said pick-off means; operating said pick-off means in a manner to move each successive top ply of fabric with a component initially parallel to and then away from the top sheet, and then to release the sheet, and lowering the stack of fabric sheets during the operation of said pick-off means to separate the top ply of fabric from the underlying fabric ply with a minimum of drag between the fabric plies.

14. The method of claim 13 which further includes the step of blowing air against the top ply of fabric rearwardly of the pick-off means during operation of the pick-off means.

15. The method of successively removing top fabric sheets from a stack wherein the sheets are folded to present more than one ply of the stack, and depositing the sheets as a single ply on moving conveyor, which comprises the steps of providing a pick-off device, supporting the stack of fabric sheets in spaced relation with said pick-off device, positioning the stack of fabric sheets such that a portion of the topmost ply of the upper sheet is in engagement with said pick-off device, operating said pick-off device to tension the topmost ply in translation and deposit at least a portion of the ply on the moving conveyor, and lowering the stack of fabric sheets during the operation of said pick-off device to separate the topmost fabric ply from the underlying fabric ply with a minimum of drag between the fabric plies.

References Cited

UNITED STATES PATENTS 3,253,824  5/1966  Southwell _____ 271—19

EDWARD A. SROKA, *Primary Examiner.*